April 1, 1969  H. L. MOORE  3,435,524
FOOD SLICING GUIDE
Filed Oct. 7, 1966
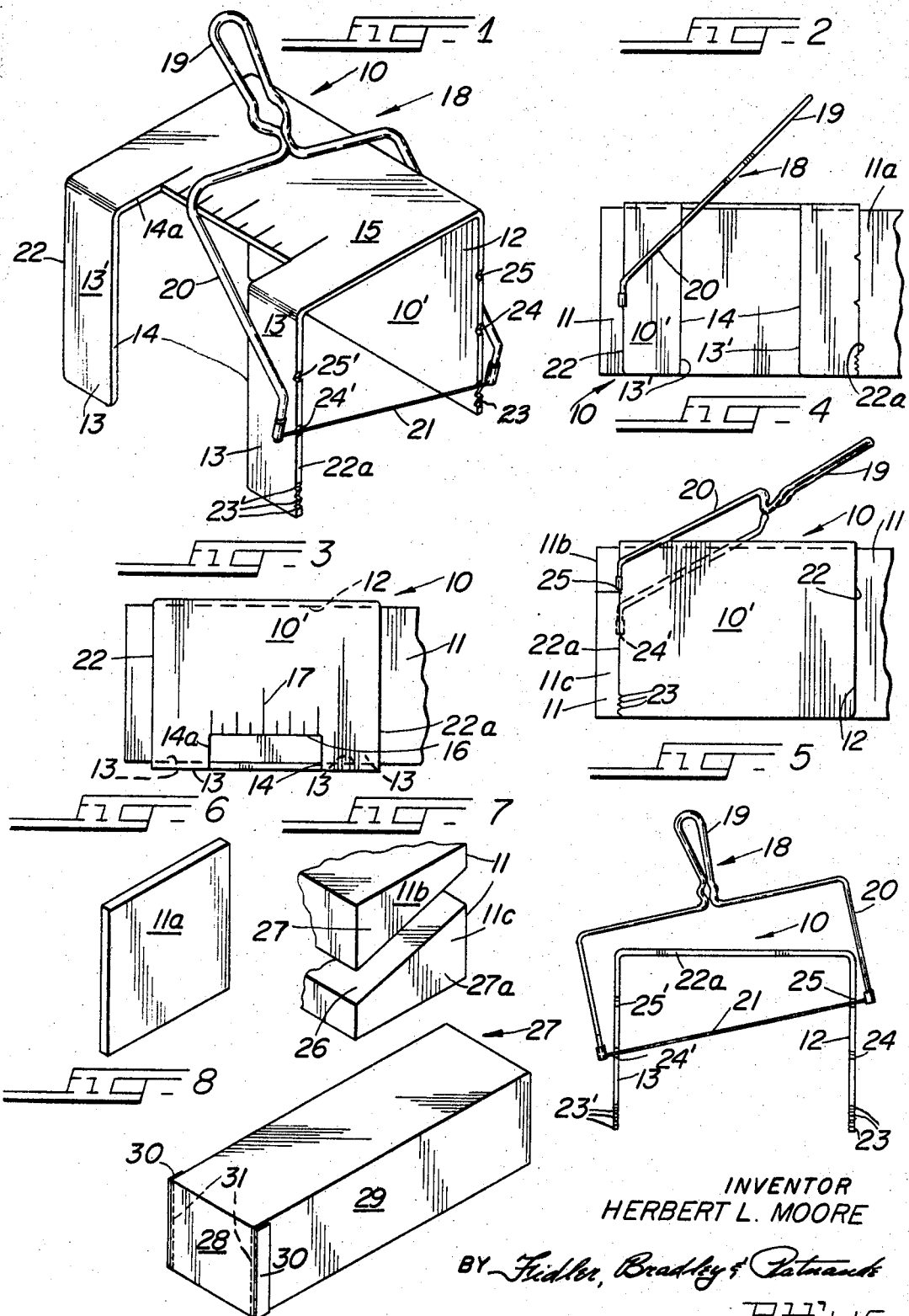
INVENTOR
HERBERT L. MOORE
BY Fidler, Bradley & Patnaude
ATT'YS.

United States Patent Office 3,435,524
Patented Apr. 1, 1969

3,435,524
FOOD SLICING GUIDE
Herbert L. Moore, 4507 N. Magnolia Ave.,
Chicago, Ill. 60640
Filed Oct. 7, 1966, Ser. No. 585,085
Int. Cl. A01j 23/00
U.S. Cl. 31—15                                    2 Claims

ABSTRACT OF THE DISCLOSURE

A food slicing guide comprises a U-shaped member having a base and a pair of oppositely disposed side walls for receiving the comestible to be sliced. The member has an opening in its side walls to enable the user to grasp the comestible. The opening extends into the base which has graduated markings adjacent the opening for gauging the uniform thickness of the slices. A food slicer can either be guided by a smooth end of the guide member, or by the opposite end which is provided with pairs of oppositely disposed notches in the side edges of the side walls to receive the slicing tool.

---

This invention relates to a food slicing guide for slicing comestibles and more particularly to a simple device in the form of an elongated U-shaped member complementally formed to the comestible to be sliced and which may be used in combination with a slicing device such as a conventional wire slicer and/or cheese slicer and the like slicing tool such as a slicing knife.

Prior to my invention other forms of slicing devices were available. One form of slicing device is particularly disclosed and claimed in the U.S. Patent 2,328,887 to R. J. Arney, granted Sept. 7, 1943. This form of slicing device comprised an elongated generally rectangular bed plate having a guide along each of its side edges. A U-shaped member consisting of a single bar having deflected extremities underly the bed plate and was swingably secured thereto for adjustment to permit the cutter carried by the arms of the bar to be adjusted to regulate the thickness of each slice cut from the body being sliced.

A cheese-cutting device is also disclosed and claimed in the U.S. Patent 2,538,426 to H. A. Olander, granted Jan. 16, 1951. This form of device comprises the combination of a holder including a base, a pair of parallel vertically extending sides, a pair of guide members attached to said sides, said guide members having like tortuous slots cut therein, and a cutting instrument comprising a frame engageable with said slots and a thin elongated blade tautly held by said frame.

Various other forms of cheese slicing devices and variable thickness slicing devices have been proposed. One of these is the cheese slicing device of J. Chambers disclosed and claimed in U.S. Patent No. 2,611,952, granted Sept. 30, 1952. This device overcomes the disadvantages of earlier similar devices by providing a device for applying a force at such a location as to substantially reduce any tendency of the guide roller used with the cutting wire to bind against the material being sliced.

The variable thickness slicing device of A. B. Cole disclosed and claimed in U.S. Patent No. 2,825,131, granted Mar. 4, 1958, contemplates the use of a slicing or cutting implement in which the cutting blade comprises a relatively fine tensioned wire in combination with an adjustable guide which may be set to produce slices of uniform and predetermined thickness.

The measuring cutter of S. Davis disclosed and claimed in U.S. Patent No. 3,057,066 describes a measuring cutter device which facilitates the cutting of specified amounts of material from a block of comestible material and in which the block of material being cut is housed within the device during cutting by a cutting wire mounted on a pair of slides adapted for sliding engagement with a pair of track ways.

As noted above, the various forms of slicing devices although satisfactory, require particular forms of cutting devices, and none can be used with a conventional form of wire cutter such as wire slicers and either adjustable and/or nonadjustable cheese slicers commercially available. It is also desirable to purchase such comestibles as cheese, meat loafs, pressed meats, butter and the like in brick, loaf and in stick form which may be purchased at a saving and wherein it is also desirable such as with cheese and various forms of pressed meats to permit them to be freshly sliced when they are to be served.

It is therefore a principal object of the invention to provide a food slicing guide for slicing a comestible in substantially brick form with a conventional wire slicer into slices of predetermined thickness, and wherein the food slicing device is further adapted for making different sizes and shaped pieces from the brick of comestible.

It is a further object of the invention to provide a food slicing guide for slicing cheese and the like with a conventional wire slicer from a loaf or brick of cheese into a plurality of slices of uniform thickness.

Still another object of the invention is to provide a food slicing guide from a container for a comestible and to be adapted so that a conventional wire cutter may be used to slice the comestible as it is moved out of an end of the container provided with a substantially rigid guide means and/or edge to be in contact with the wire cutter in the slicing of the comestible as it is moved from the open end of the container.

The principal feature of the invention is to provide a food slicing guide in an open ended and inverted substantially U-shaped form provided with an opening in a leg of the food slicing guide which may extend into the base of the food slicing guide intermediate the ends thereof so that the user may hold a brick of the comestible in position within the guide as he slices it along one end to slice the comestible. Graduations may be provided adjacent the edge of the opening within the base to facilitate making slices of uniform thickness. Notches or grooves may be symmetrically positioned on the ends of the opposite legs of the other end of the food slicing guide to enable the user to quarter, slice slabs of different sizes and/or thicknesses and make diagonal cuts for different shaped pieces.

In another embodiment of the invention, a container for a comestible such as cheese and the like is provided. The container may include plastic or metal members at one perforated end thereof to permit the end to be bent therein and the comestible moved out of the end of the container and sliced off in the conventional manner.

Further and additional objects and features of the invention will appear from the description, accompanying drawings and appended claims.

In accordance with one embodiment of the invention, a food slicing guide for slicing comestibles in the form of bricks, loafs, sticks and the like of cheese, meat, butter and margarine, vegetables, eggs, loaf cake, and ice cream and other forms of comestibles in the form of sausages comprises an elongated U-shaped member substantially complementally formed to the shape in cross-section of the comestible to be sliced, and said elongated U-shaped member includes substantially parallel and horizontally spaced vertical legs and a substantially horizontal base member operatively interconnecting said spaced vertical legs, said elongated U-shaped member providing U-shaped openings at each end permitting relative movement of the comestible being sliced with respect to the elongated U-shaped member, and the ends of the U-shaped member adapted for positioning a slicing tool for slicing the comestible movably mounted within the slicing guide. The food slicing guide is provided with an opening in one of the horizontally spaced vertical legs intermediate the ends of the elongated U-shaped member with the opening preferably extending partially within the substantially horizontal base member and in alignment with the aforesaid opening in one of said horizontally spaced vertical legs. Indicia means may be provided along an edge of the opening extending partially within the substantially horizontal base member, and with the edge extending parallel to the horizontally spaced vertical legs. The indicia means provide graduations for uniform slicing of the comestible.

Another embodiment of the invention may take the form of a carton for a comestible in substantially the form of a brick elongated in length and having a cross-section substantially rectangular in shape, said carton therefor substantially complementally formed to receive the brick-like shape of the comestible and the carton having a substantially U-shaped cross-section provided by the substantially parallel and horizontally spaced legs forming the sides of the carton and a substantially horizontal base member operatively interconnecting said spaced vertical legs forming the top of the carton. One of said ends of the carton may be provided with oppositely arranged and laterally spaced perforations contiguous to the ends of the horizontally spaced legs forming the sides of the carton, oppositely arranged and parallel rigid guide edge means adapted to be operatively engaged by a slicing device and operatively affixed to the spaced vertical legs contiguous to the laterally spaced perforations at the juncture of the end edges of the spaced vertical legs may be provided at the aforesaid end of the carton provided with the perforations. The perforations permit the end of the carton to be bent along the top edge of the end of the carton providing a U-shaped opening so that the comestible may be moved out of the open end of the carton so that comestible as it is moved out is adapted to be sliced by a slicing tool in operative engagement with the rigid guide means.

For a more complete understanding of the invention, reference may now be had to the drawings, and primed reference characters indicate the same or similar parts, wherein:

FIG. 1 is a perspective view illustrating the food slicing guide with a wire slicer positioned for making a diagonal cut, and further illustrating grooves enabling making different sizes and shaped pieces of comestible;

FIG. 2 is a view in elevation illustrating the food slicing guide of FIG. 1 arranged for slicing, with a wire slicer, a slice of comestible from a brick thereof;

FIG. 3 is a top plan view of the food slicing guide placed in position over a comestible in brick form to be sliced;

FIG. 4 is a view in vertical elevation illustrating the food slicing guide in position with respect to a brick of comestible and the cutting wire of a wire slicer arranged in certain grooves at one end of the slicing guide to make a diagonal cut for severing the brick of comestible into substantially trapezoid shaped prisms of the comestible;

FIG. 5 is an end view of the arrangement of FIG. 4 with the brick of comestible removed;

FIG. 6 illustrates a slice of comestible as sliced with the arrangement of the food slicing guide and wire cutter of FIG. 2;

FIG. 7 illustrates in perspective the trapezoidal shaped prisms of comestible, as separated, after the comestible is sliced with a diagonal cut by the arrangement of the food slicing guide and wire cutter of FIGS. 4 and 5; and FIG. 8 illustrates in perspective another embodiment of the invention wherein a carton for a comestible is adapted to form a food slicing guide for a slicing tool such as a knife and/or wire cutter.

Referring to FIGS. 1 through 5, a food slicing guide 10 is preferably an inverted elongated U-shaped member 10' substantially complementally formed to the shape in cross-section of a loaf, brick or the like form 11 of a comestible such as cheese, butter, margine, meat loaf or pressed meat, loaf cakes, and ice cream to be sliced. The elongated U-shaped member 10' includes substantially parallel and horizontally spaced right and left legs 12 and 13. The U-shaped member 10 may be suitably formed by rolling and/or extruding, and furthermore may be molded by injection molding or forming from suitable plastics such as polyethylene, "nylon," "acrylics," or high strength polystyrene. If formed from plastic, the food slicing guide may be formed from clear plastics or colored plastics to match the decor of a kitchen or other kitchen utensils as a housewife might select. Likewise, if the food slicing guide is fabricated of non-metal, it may be suitably painted any desired color by spraying or dipping, and may be suitably nickel or chromium plated, if fabricated from sheet steel. If fabricated from aluminum the slicing guide may be polished and/or anodized in suitable colors.

Whether formed from sheet metal or molded or extruded from plastic, it is also preferred that the elongated vertical slot 14 shall have an elongated horizontal portion 14a provided in the base 15 of the elongated U-shaped member 10'. An inner edge 16 of the U-shaped slot 14 may be provided with indicia 17 which in this embodiment is divided into ¼", ½", and 1" spacings across the edge 16 which is substantially 2" long. It is to be understood that this edge may be graduated into ⅛" ¹⁄₁₆" spacings or even ¹⁄₃₂" spacings to permit the user to slice the comestible into suitable thicknesses depending upon the comestible as to whether it may be sliced into relatively thin or thick slices as may be desired. The indicia or graduations 17 of predetermined spacing are used to facilitate making the slices of predetermined and uniform thickness.

The preferred form of food slicing guide as illustrated has a cross-section in the form of a square 3" x 3" and a length of 4". The horizontal part 14a of the 2" wide slot extends substantially ½" at the base 15. The slot 14 permits the user of the slicing guide to grasp the loaf or brick of the comestible with the fingers of the left-hand with the thumb engaging the opposite leg if the user is right-handed as he slices a single slice, as illustrated in FIGS. 2 and 3. The food slicer as illustrated is of such proportions that a usual two pound brick of cheese or one pound brick of butter may be readily sliced. It is within the scope of the invention that the slicing guide may be suitably dimensioned for conventional five pound brick of cheese or other large loafs or bricks of comestible. It will be understood that the provision of the slot 14 permits the guide to be readily used for slicing bricks of smaller dimension since the user may insert his fingers through the slot to hold the brick against the opposite side 10' of the guide 10.

Referring to FIGS. 1, 4, 5 and 7, the food slicing guide 10 is constructed to be used in combination with a conventional wire slicer or cheese slicer 18 having a wire handle 19 and a U-shaped portion 20, and the wire slicer includes a wire cutter 21 of a piano wire suitably affixed to the ends of the U-shaped portion 20. A U-shaped end 22a of the slicing guide which is opposite the U-shaped end 22 and used for slicing as described with reference to FIG. 2 and FIG. 6, is provided with an arangement of symmetrically arranged grooves 23, 23', 24, 24', and 25, 25'. These grooves enable the user of the slicing guide to make different sizes and shaped pieces. The group of grooves 23, 23' are preferably used for slicing slabs of cheese for example, throughout the length of the brick of cheese. These grooves 23, 23' may be arranged to cut slabs from ¼", ⅜" and ½" thickness. Other arrangements of the grooves 23, 23' for slicing various thicknesses of slabs may suggest themselves without departing from the scope of the invention. The grooves 24, 24' with the wire 21 of the slicer 18 positioned therein permits the quartering of a one pound brick of butter, upon cutting the brick first in one direction and then turning the brick of butter 90° and completing the slicing forming four ¼ pound sticks of butter.

Referring to FIGS. 1, 4, 5 and 7, the wire slicer 18 is illustrated in FIG. 1 to make a diagonal cut with the wire 21 of the slicer arranged, for example in the upper groove 23 and the upper groove 24' on the opposite side. In FIGS. 4, 5, and 7 the wire slicer 18 in FIGS. 4 and 5 is arranged with the wire 21 arranged in grooves 25 and 24' to make the diagonal cut 26, FIG. 7, with the upper slab 27 moved apart from the lower slab 27a to better illustrate the trapezoid shaped slabs. It is also evident that other complementally shaped slab may be formed with the present arrangement of grooves and any other optional arrangement of grooves. In making the diagonal cuts as illustrated in FIGS. 1, 4, 5, and 7 the wire slicer 18 after arrangement of the wire 21 in the preselected grooves, is held for example in the right hand with the wire 21 held as taut as possible within the grooves, and at the same time the slicing guide is held by the right hand. As the comestible 11 as shown in FIG. 5 is pushed to the left by the left hand the wire 21 makes a diagonal cut 26 separating the brick 11 of cheese or the comestible into complementally formed portions. If it is desired to make slices of trapezoidal shape a diagonal cut may be first made and afterward the extended portion as shown in FIG. 4 sliced off vertically into one or two parts as desired. If the entire brick is to be sliced in pieces of different shape, the wire slicer may be used to slice the separated brick on either end 22a or 22. However, for slicing vertically, it is prefered to use the straight edge 22 rather than the grooved edge 22a as the wire 21 will tend to slip into the grooves as it is moved vertically downward.

It is to be understood that this slicing guide may be used with wrapped comestibles such as butter and margarine as sold commercially. For example, one pound bricks of butter are wrapped in a wrapper which has a scale graduated both in tablespoons and cups. Some packaged sticks of margarines have a "Handy Measure Chart" graduated in tablespoons and cups. Also, some sticks of butter have a chart on the wrapper indicating teaspoons and tablespoons. With butter and margarines packaged in this manner, a wire slicer may cut at the place desired for the particular measurement. In order to make more accurate slices although the slicer of the embodiment used for bricks may be used, it is also within the scope of the invention to provide a food slicing guide to take ¼ pound sticks of comestible only.

Although it is preferred to fabricate the food slicing guide from sheet metal, preferably within the range of 20 gauge to 16 gauge to make it as light as possible and to provide an edge for the wire slicer to properly engage, it is also within the scope of the invention to fabricate the slicing guide from suitable plasic within the range of $\frac{1}{16}''$ thick to $\frac{1}{8}''$ thick to provide a proper slicing edge. If desired, the edges may be formed of rolled or beaded edges and if necessary flanged. Molded slicing guides may be similarly formed with proper width slicing edges whether formed or molded metal or plastic.

Referring to FIG. 8, there is illustrated a cheese box or comestible carton 27, and particularly a conventional cover of a cheese carton. In this embodiment, one end 28 is provided at each opposite side 29 with similarly formed rigid guide edges 30 of suitable metal or plastic material and affixed by suitably formed lugs, etc. such as cementing as desired in the forming of cartons of this type. The end 28 contiguous to its respective edges and the guide edges 30 is preferably perforated at 31 so that the end 28 may be bent therein and the brick of cheese or other comestible moved out of the open end of the box and sliced off in the regular manner with a conventional wire slicer or slicing knife. If desired the guide edges 28 may be formed with grooves similar to grooves 23, 24, and 25 as described above. In the usual cheese carton, the cover is formed from light weight cardboard, and the other half is formed of corrugated cardboard in which is packaged the brick of cheese. The invention is equally adapted for modifying the inner carton leaving the cover as normally fabricated. Likewise, this embodiment is adapted for modifying a carton for packaging sticks of butter or margarine. In such a package as the end may be opened, it is unnecessary to have the end of the carton perforated but only to have the edges of the carton provided with the rigid guide edges 30 as described above.

From the foregoing, it will be readily seen that a simple and inexpensive food slicing guide for loaf or brick form of comestible and for even sausage like forms of meats in brick or cylindrical form may be provided which will cut the various chosen slices in uniform thickness. It is preferred to use this form of food slicing device when using a wire slicer in cutting vertical slices with a cutting board with the comestible extending over the edge of the cutting board to permit the wire of the wire cutter to pass completely through the comestible particularly with the wire slicer as shown in vertical slicing. It is also possible to use cheese slicers with rollers, either adjustable or non-adjustable for vertical slicing.

While several embodiments of this invention have been described, it is to be understood that this invention is not to be limited thereto since many modifications may be made and it is therefore contemplated that the appended claims cover any such modifications as fall within the spirit and scope of this invention.

What is claimed is:

1. A food slicing guide for guiding a slicing tool to slice a comestible comprising:

an elongated substantially U-shaped member to receive the comestible to be sliced, said member including a base and a pair of parallel spaced side walls extending therefrom, said member having its ends formed by the pairs of the side edges of the opposite side walls and the side edges of the base;

means defining an opening in said member, said opening extending from one of said side walls into a portion of said base so that the portion of said opening in said side wall permits the comestible to be grasped by the hand of the user to hold the comestible against the inside surface of the opposite side wall and the portion of said opening in said base permits the comestible to be viewed by the user;

indicia means adjacent the opening in said base to indicate the relative position of the comestible inserted into the member so that a predetermined thickness of the comestible slices to be formed can be gauged; and one of said ends of the member having smooth surfaces for guiding the slicing tool to slice the comestible movably positioned within the member in accordance with the indication of said indicia means, whereby access can be gained through the portion of said opening in said base to make a mark in the comestible adjacent said indicia means so that after slicing the comestible, the comestible can be advanced to a new position relative to the member as indicated by the indicia means and the mark on the comestible as viewed through the opening in the base to form uniform size slices of the comestible, and including means defining pairs of oppositely disposed grooves in the side edges of the side walls forming the other one of said ends of the U-shaped member for receiving the cutting tool to adjustably position it relative to the base so that the cutting tool and the U-shaped member can be moved in unison relative to the comestible for slicing it into predetermined uniform sizes and shapes of comestible slices, whereby either end of the U-shaped member may be alternatively used to guide the slicing tool.

2. A food slicing guide according to claim 1, wherein said indicia means comprises a series of graduated markings on said base adjacent an edge of said opening in said base so that said mark in said comestible can be aligned with the graduated markings as the comestible is advanced relative to the U-shaped member.

References Cited

UNITED STATES PATENTS

| | | | |
|---|---|---|---|
| 865,447 | 9/1907 | Stewart | 31—22 |
| 1,848,186 | 3/1932 | McDonald | 31—20 |
| 1,892,861 | 1/1933 | Welty | 31—20 X |
| 2,474,171 | 6/1949 | Swanson | 146—150 |
| 2,538,426 | 1/1951 | Olander | 30—116 X |
| 2,617,190 | 11/1952 | Taylor | 146—150 X |
| 2,650,428 | 9/1953 | Epperson | 31—20 |
| 622,898 | 4/1899 | Lehy | 31—20 |
| 2,733,518 | 2/1956 | Zegon | 33—197 |

FOREIGN PATENTS

| | | |
|---|---|---|
| 603,477 | 12/1945 | Great Britain. |
| 1,023,728 | 3/1965 | Great Britain. |

ANDREW R. JUHASZ, *Primary Examiner.*

G. WEIDENFELD, *Assistant Examiner.*

U.S. Cl. X.R.

30—116; 31—20; 33—174